US010707906B2

(12) United States Patent
Ping (10) Patent No.: US 10,707,906 B2
(45) Date of Patent: Jul. 7, 2020

(54) RADIO FREQUENCY TRANSMISSION CIRCUIT, CIRCUIT MATCHING METHOD AND COMPUTER STORAGE MEDIUM

(71) Applicant: ZTE CORPORATION, Shenzhen, Guangdong (CN)

(72) Inventor: Pengfei Ping, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/304,320

(22) PCT Filed: Nov. 10, 2016

(86) PCT No.: PCT/CN2016/105376
§ 371 (c)(1),
(2) Date: Nov. 26, 2018

(87) PCT Pub. No.: WO2017/201978
PCT Pub. Date: Nov. 30, 2017

(65) Prior Publication Data
US 2019/0140672 A1    May 9, 2019

(30) Foreign Application Priority Data
May 26, 2016    (CN) .......................... 2016 1 0362791

(51) Int. Cl.
*H04B 1/00* (2006.01)
*H04B 17/14* (2015.01)
*H04B 1/04* (2006.01)

(52) U.S. Cl.
CPC .......... *H04B 1/006* (2013.01); *H04B 1/0458* (2013.01); *H04B 1/0483* (2013.01); *H04B 17/14* (2015.01)

(58) Field of Classification Search
CPC .... H02J 7/007; H03F 2200/387; H03F 1/565; H03F 3/195; H03F 2203/21139;
(Continued)

(56) References Cited

U.S. PATENT DOCUMENTS

2005/0181750 A1    8/2005    Pinks
2006/0053321 A1*   3/2006    Mizusawa ............ H04B 1/0458
                                                     713/300
(Continued)

FOREIGN PATENT DOCUMENTS

CN         1767399 A       5/2006
CN       104539306 A       4/2015
(Continued)

OTHER PUBLICATIONS

WIPO, International Search Report dated Jan. 13, 2017.

*Primary Examiner* — Kwasi Karikari
(74) *Attorney, Agent, or Firm* — Lai & Cai Intellectual Property (USA) Office (57) ABSTRACT

Disclosed in embodiments of the present disclosure are a radio frequency transmission circuit and circuit matching method. The radio frequency transmission circuit includes: a control unit and at least one transmission loop unit. The transmission loop unit includes at least one predetermined matching loop, and the control unit is pre-stored with a correspondence relationship between predetermined transmission powers and predetermined matching loops. The control unit is used to determine, according to the pre-stored correspondence relationship between the predetermined transmission powers and the predetermined matching loops, a predetermined matching loop corresponding to the received transmission power as a first matching loop, and
(Continued)

control the first matching loop to operate. Also provided in the embodiments of the present disclosure is a computer storage medium.

12 Claims, 6 Drawing Sheets

(58) Field of Classification Search
CPC .. H03F 2203/21109; H03F 2203/21112; H03F 2203/21124; H04B 5/0037; H04B 1/04; H04B 2001/0408
See application file for complete search history.

(56) References Cited

U.S. PATENT DOCUMENTS

2006/0094458 A1* 5/2006 Kitaji .................. H04B 1/0458
 455/522
2006/0094486 A1 5/2006 Cho
2016/0308573 A1 10/2016 Bai

FOREIGN PATENT DOCUMENTS

| CN | 105306090 A | 2/2016 |
| CN | 105337631 A | 2/2016 |

\* cited by examiner

RADIO FREQUENCY TRANSMISSION CIRCUIT, CIRCUIT MATCHING METHOD AND COMPUTER STORAGE MEDIUM

TECHNICAL FIELD

The present disclosure relates to radio frequency technology in the field of communications, and in particular to a radio frequency transmission circuit, a circuit matching method and a computer storage medium.

BACKGROUND

The transmission circuit of a radio frequency circuit generally consists of a transceiver, a power amplifier, a duplexer or a filter, an antenna, and some matching circuits. After an entire circuit layout is finished, an entire radio frequency circuit achieves the best radio frequency performance at a target power by adjusting matching circuits between the transceiver and the power amplifier and between the power amplifier and the duplexer or filter.

However, there is still a problem of large power consumption when terminal devices are actually used.

SUMMARY

Embodiments of the present disclosure provide a radio frequency transmission circuit and a circuit matching method, and it is desirable to reduce power consumption of the entire radio frequency circuit.

The technical solution of the embodiment of the present disclosure is implemented as follows.

An embodiment of the present disclosure provides a radio frequency transmission circuit, includes: a control unit, at least one transmission loop unit, the transmission loop unit including at least one predetermined matching loop, and the control unit pre-storing a correspondence relationship between predetermined transmission powers and predetermined matching loops, wherein the control unit is configured to determine, according to the pre-stored correspondence relationship between the predetermined transmission powers and the predetermined matching loops, a predetermined matching loop corresponding to the received transmission power as a first matching loop, and control the first matching loop to work.

An embodiment of the present disclosure provides a circuit matching method, includes: determining, according to a pre-stored correspondence relationship between predetermined transmission powers and predetermined matching loops, a predetermined matching loop corresponding to a received transmission power as a first matching loop, and controlling the first matching loop to work.

An embodiment of the present disclosure provides a computer storage medium in which computer executable instructions are stored, and the computer executable instructions are used to perform the circuit matching methods described as above.

An embodiment of the present disclosure provides a radio frequency transmission circuit, includes: a control unit, at least one transmission loop unit, the transmission loop unit including at least one predetermined matching loop, and the control unit pre-storing a correspondence relationship between predetermined transmission powers and predetermined matching loops, wherein the control unit is configured to determine, according to the pre-stored correspondence relationship between the predetermined transmission powers and the predetermined matching loops, a predeter-mined matching loop corresponding to the received transmission power as a first matching loop, and control the first matching loop to work. The radio frequency transmission circuit and the circuit matching method provided by the embodiments of the present disclosure can dynamically adjust a matching circuit according to a current transmission power, thereby achieving better impedance matching, so when a transmission index of the transmission circuit reaches a standard, power consumption of impedance mismatch and power consumption required by a terminal transmission circuit and power consumption of the entire radio frequency circuit may be reduced, thereby reducing power consumption of a terminal and prolonging standby time of the terminal.

DETAILED DESCRIPTION

The technical solutions in the embodiments of the present disclosure are clearly and completely described in the following with reference to the accompanying drawings showing the embodiments of the present disclosure. It is understood that the embodiments described below are only used to illustrate and explain the present disclosure, but not intended to limit this disclosure.

Typically, a transmission circuit of a radio frequency circuit consists of a transceiver, a power amplifier, a duplexer or filter, an antenna, and some matching circuits. When the entire circuit layout is finished, positions of the transceiver, the power amplifier, the duplexer or the filter, and the antenna will be fixed. In this case, matching between the various connected devices needs to be adjusted to optimize various performances related to transmission. Among these radio frequency performances, attention is paid to transmission powers and the corresponding ACLR and current of the power amplifier at this transmission power.

A relationship between a transmission power, ACLR and current of the power amplifier includes: when a same radio frequency circuit has a same transmission power, the ACLR is inversely proportional to the current of the power amplifier; when the same radio frequency circuit has a matching circuit determined and transmission powers are different, the lower the transmission power, the smaller the ACLR and current will be.

In actual work, an adjustment of a radio frequency circuit is adjusting the current of power amplifier and ACLR at the maximum transmission power specified by the standard, and the transmission power of a terminal device in actual operation is dynamic, and is smaller than the maximum transmission power most of the time, and in this case the ACLR is smaller than a ACLR at the maximum transmission power. In a related art, the matching circuit will not be changed after the adjustment is finished, so the ACLR cannot be made larger by adjusting matching again, thus an operating current of the power amplifier cannot continue to be smaller. A radio frequency transmission circuit provided by the embodiment of the disclosure can adjust the matching again after an adjustment of matching circuit is finished, so that the ACLR is the same as a ACLR at the maximum transmission power, and the operating current of the power amplifier is reduced again, thereby achieving the purpose of reducing power consumption.

Figure 1:
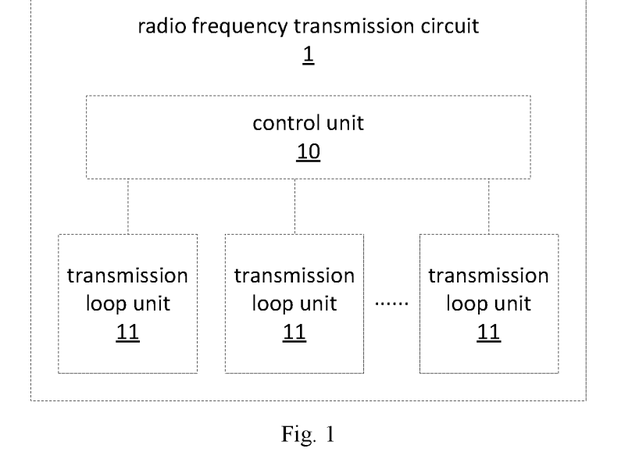
FIG. 1 is a first schematic structural diagram of a radio frequency transmission circuit according to an embodiment of the present disclosure.

The embodiment of the present disclosure provides a radio frequency transmission circuit 1. As shown in FIG. 1, the radio frequency transmission circuit 1 includes: a control unit 10, at least one transmission loop unit 11. The transmission loop unit 11 includes at least one predetermined matching loop. The control unit 10 pre-stores a correspondence relationship between predetermined transmission powers and predetermined matching loops in advance.

The control unit 10 is configured to determine, according to the pre-stored correspondence relationship between the predetermined transmission powers and the predetermined matching loops, a predetermined matching loop corresponding to the received transmission power as a first matching loop, and control the first matching loop to operate.

In the embodiment, the control unit 10 may be a processor in a terminal, such as an application processor (AP), a central processing unit (CPU), a digital signal processor (DSP), a digital signal processor (DSP), a Field Programmable Gate Array (FPGA) or a Micro Central Processing Unit (MCU). The control unit 10 may also correspond to a processing circuit. The processing circuit may include a specific integrated circuit.

Figure 2:
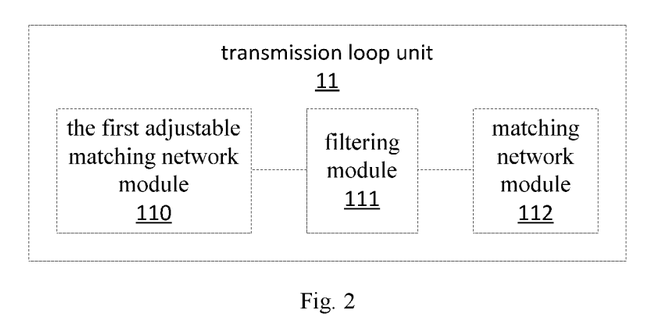
FIG. 2 is a first schematic structural diagram of a transmission loop unit according to an embodiment of the present disclosure.

In an embodiment, as shown in FIG. 2, the transmission loop unit 11 includes: a first adjustable matching network module 110, a filtering module 111 connected to the first adjustable matching network module 110, and a matching network module 112 connected to the filtering module 111.

The first adjustable matching network module 110 includes at least one first predetermined matching loop, and the at least one first predetermined matching loop includes a first end and a second end. The first end is connected to the control unit 10, and the second end is connected to the filtering module 111.

Figure 3:
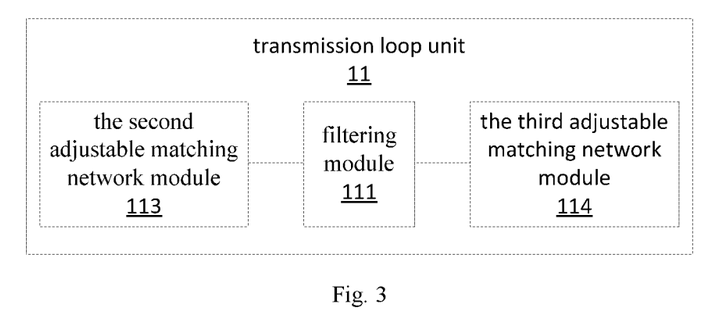
FIG. 3 is a second schematic structural diagram of a transmission loop unit according to an embodiment of the present disclosure.

In an embodiment, as shown in FIG. 3, the transmission loop unit 11 includes: a second adjustable matching network module 113, a filtering module 111 connected to the second adjustable matching network module 113, and a third adjustable matching network module 114 connected to the filtering module 111.

The second adjustable matching network module 113 includes at least one second predetermined matching loop, and the at least one second predetermined matching loop includes a third end and a fourth end. The third end is connected to the control unit 10, and the fourth end is connected to the filtering module 111.

The third adjustable matching network module 114 includes at least one third predetermined matching loop, and the at least one second predetermined matching loop includes a fifth end and a sixth end. The fifth end is connected to the filtering module 111 and the sixth end is connected to a switch unit.

In an embodiment, the first adjustable matching network module 110 is a dual L type, Π type, or a T type.

In an embodiment, the second adjustable matching network module 113 is dual L type, Π type, or T type;

In an embodiment, the third adjustable matching network module 114 is a double L type, Π type, or a T type.

In an embodiment, the control unit 10 is configured to determine, according to the pre-stored correspondence relationship between the predetermined transmission powers and the predetermined matching loops, a predetermined transmission power having the smallest difference from the received transmission power as a first transmission power, and the first transmission power is greater than the received transmission power, and determine a predetermined matching loop corresponding to the first transmission power as the first matching loop, and control the first matching loop to operate.

Figure 4:
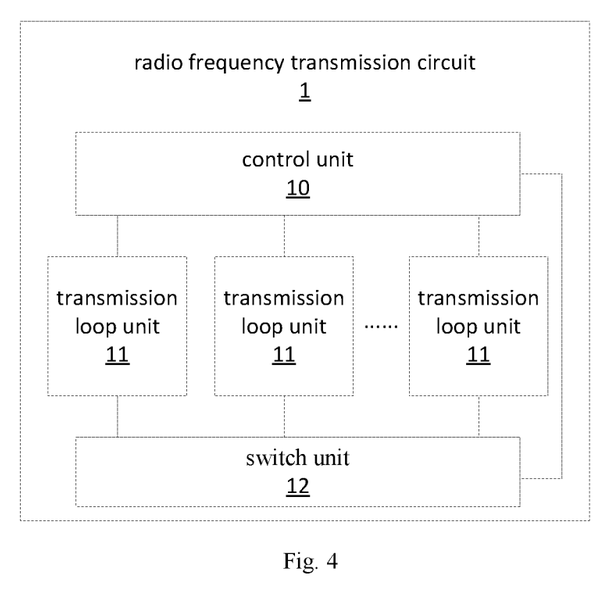
FIG. 4 is a second schematic structural diagram of a radio frequency transmission circuit according to an embodiment of the present disclosure.

In an embodiment, as shown in FIG. 4, the radio frequency transmission circuit includes a switch unit 12 configured to select different working frequency bands and detect powers.

Figure 5:
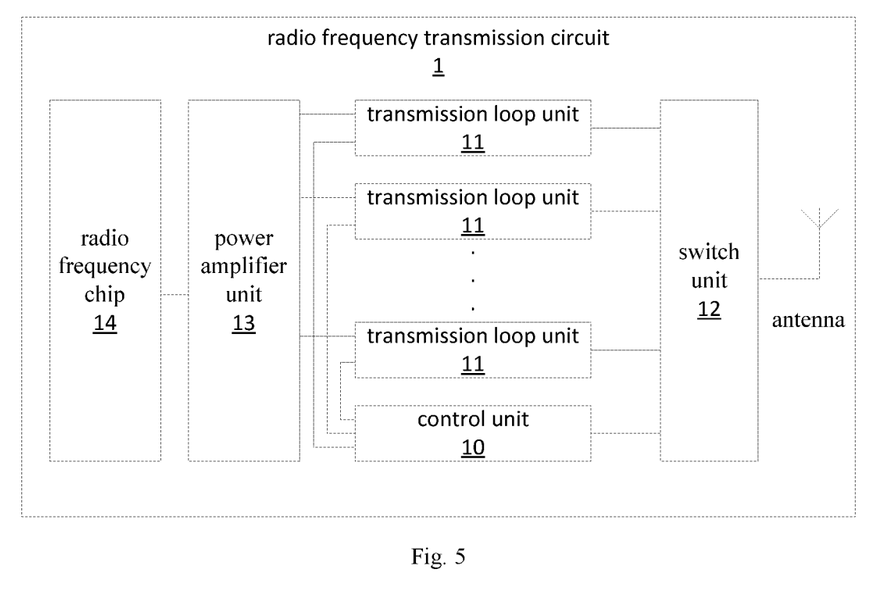
FIG. 5 is a third schematic structural diagram of a radio frequency transmission circuit according to an embodiment of the present disclosure.

Exemplarily, as shown in FIG. 5, the radio frequency transmission circuit 1 provided by the embodiment of the present disclosure may include a radio frequency chip 14, a power amplifier unit 13, the switch unit 12, the control unit 10, an antenna, and one or more transmission loop units 11 having a same structure. The operation principle of each of the plurality of transmission loop units 11 is the same as that of one transmission loop unit 11.

Figure 6:
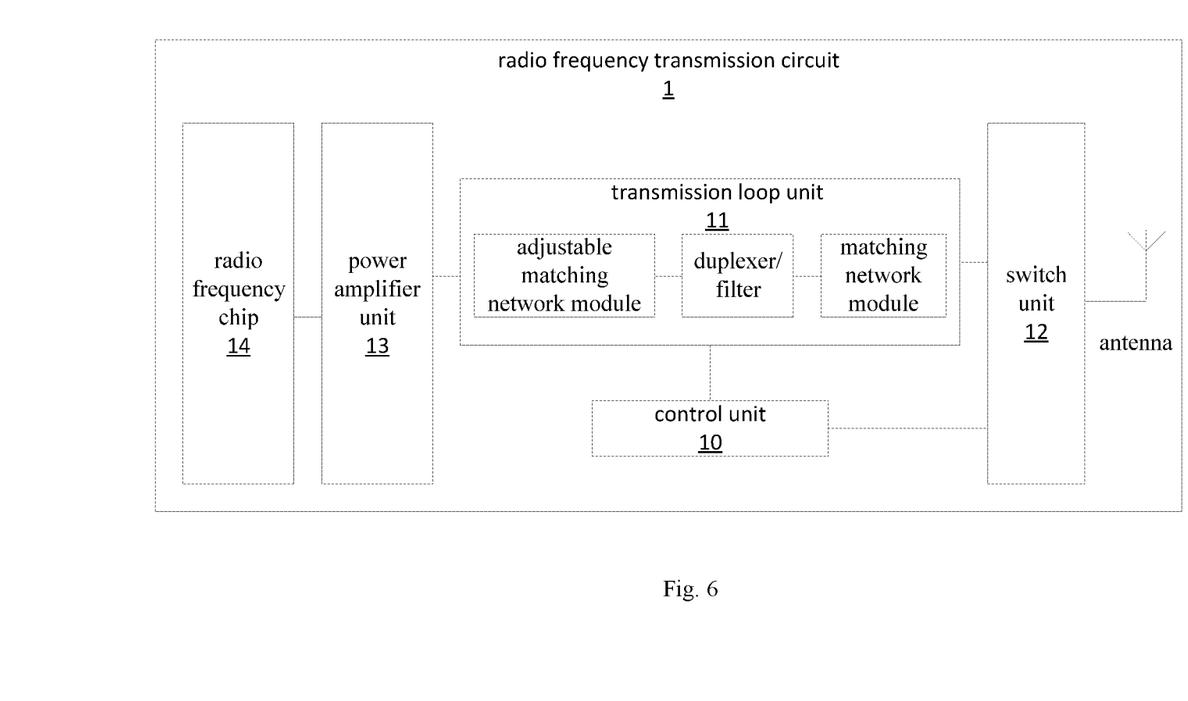
FIG. 6 is a fourth schematic structural diagram of a radio frequency transmission circuit according to an embodiment of the present disclosure.

In a possible implementation, as shown in FIG. 6, illustration is made on the basis that the radio frequency transmission circuit 1 includes one transmission loop unit 11. The transmission loop unit 11 may include an adjustable matching network module, a duplexer/filter, and a matching network, here, the filtering module 111 of the transmission loop unit 11 is specifically the duplexer/filter.

As shown in FIG. 6, an input end of the adjustable matching network module is connected to an output end of the power amplifier unit 13, an output end of the adjustable matching network module is connected to an input end of the duplexer/filter, a control end of the adjustable matching network is connected to the control unit 10, and the adjustable matching network module is used to match output load of the power amplifier unit 13.

Figure 8:
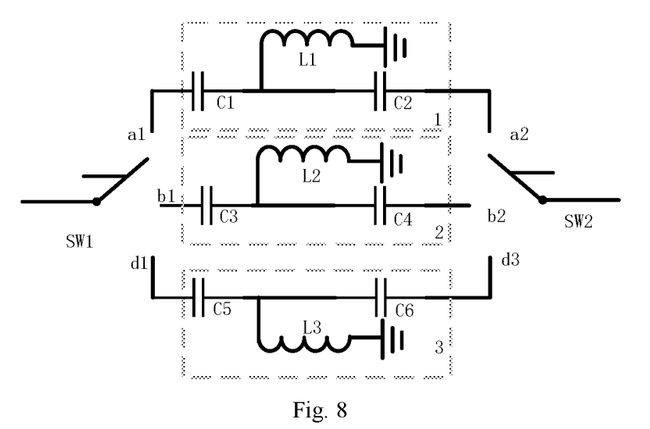
FIG. 8 is a first schematic diagram of a T-type adjustable matching network according to an embodiment of the present disclosure.

In an embodiment, the adjustable matching network module may include adjustable capacitors and adjustable inductors, and may be any one of T-type, double-L type, and Π-type formed by the capacitors and the inductors. For example, such as shown in FIG. 8, it includes a plurality of T-type matching circuits, and one of the loops is selected by switches SW1 and SW2.

As shown in FIG. 6, an input end of the matching network module is connected to an output end of the duplexer/filter, an output end of the matching network module is connected to the switch unit 12, and a control end of the matching network module is connected to the control unit 10. The function of the matching network module is keeping convergences of frequency points in a pass-band of frequency band consistent. The matching network module is used to match the duplexer/filter and the switch unit 12.

The switch unit 12 is configured to select different working frequency bands. One working frequency band corresponds to one matching loop, that is, the switch unit 12 is configured to select different matching loops. The switch unit 12 may also have a function of power detection, and a power monitoring point of the switch unit 12 is connected to a power sampling point of the control unit 10.

The control unit 10 may include a memory chip and a microprocessor. The storage chip is used for storing a matching after an adjustment is finished, and the microprocessor is used to sample the output power and controls switches in the adjustable matching network module.

Exemplarily, the T-type matching circuit of FIG. 8 illustrates a working process of the radio frequency transmission circuit. In the early stage of adjustment, a transmission power of a terminal is adjusted. For example, when the transmission power of the terminal is adjusted to 20 dBm, a matching loop 1 of an adjustable matching network is adjusted, where the matching loop 1 is a loop formed by a switch SW1 being closed to a contact a1, and a switch SW2 being closed to a contact a2, thus capacitors C1, C2 and an inductor L1 in the matching loop 1 are adjusted to make current and stray current optimal, and matching of the capacitors and the inductor at this time is recorded, that is, the adjusted matching loop 1 is saved; then adjusting the next transmission power, for example, 15 dBm of the transmission power, and a matching loop 2 of the adjustable matching network is adjusted, and the matching loop 2 is a loop formed by the switch SW1 being closed to a contact b1 and the switch SW2 being closed to a contact b2, thus capacitors C3, C4, and an inductor L2 in the matching loop 2 are adjusted to make current and stray current optimal, and matching of the capacitors and the inductor of the matching loop 2 at this time is recorded, that is, the adjusted matching loop 2 is saved; in this way, the next transmission power is adjusted, for example, 10 dBm of the transmission power, and a matching loop 3 of the adjustable matching network is adjusted, and the matching loop 3 is a loop formed by the switch SW1 being closed to a contact d1 and the switch SW2 being closed to a contact d2, thus capacitors C5, C6, and an inductor L3 in the matching loop 3 are adjusted to make current and stray current optimal, and matching of the capacitors and the inductor at this time is recorded, that is, the adjusted matching loop 3 is saved, and correspondence relationships between respective transmission powers and respective matching loops are recorded in a memory of a control unit.

It should be noted that three matching loops can be stored in the T-type matching circuit in FIG. 8. Therefore, one transmission loop unit applying the T-type matching circuit in FIG. 8 may store three matching loops. When there are a plurality of transmission loop units applying the T-type matching circuit in FIG. 8, matching loops can be determined for each of the plurality of transmission loop units by using above method, so that a plurality of different transmission powers and corresponding matching loops can be determined, and correspondence relationships between respective transmission powers and respective matching loops are recorded in the memory of the control unit. Then, during operation of the radio frequency transmission circuit, the control unit selects corresponding contacts according to the received transmission power.

During the operation of the radio frequency transmission circuit, if the control unit 10 detects that a currently received transmission power is smaller than 20 dBm and is greater than 15 dBm, the control unit 10 queries the pre-stored correspondence relationships between respective transmission powers and respective matching loops to determine a matching loop of the current transmission power to be the matching loop corresponding to the transmission power 20 dBm in the adjustable matching network, such as the matching loop 1 shown in FIG. 8, and then the switch SW1 in the adjustable matching network is controlled to be closed to the contact a1, and the switch SW2 is controlled to be closed to the contact a2, and the matching loop 1 starts to work. When it is detected that the currently received transmission power is less than 15 dBm and greater than 10 dBm, the control unit 10 queries the pre-stored correspondence relationships between respective transmission powers and respective matching loop to determine a matching loop of the current transmission power to be the matching loop corresponding to the transmission power 15 dBm in the adjustable matching network, such as the matching loop 2 shown in FIG. 8, and then the switch SW1 in the adjustable matching network is controlled to be closed to the contact b1 and the switch SW2 is controlled to be closed to the contact b2, and the matching loop 2 starts to work. In the same way, when the currently received transmission power is less than 10 dBm and greater than 5 dBm, the matching loop 3 selected by the switches SW1 and SW2 starts to work, that is, the switch SW1 in the adjustable matching network is controlled to be closed to the contact d1, the switch SW2 is controlled to be closed to the contact d2, and so on. Based on the received transmission power, according to the pre-stored correspondence relationship between the transmission powers and the matching loops, a transmission power having the smallest difference from the received transmission power is determined as a first transmission power, and the first transmission power is greater than the received transmission power, and a matching loop corresponding to the first transmission power is determined as a first matching loop, and the first matching loop is controlled to start to work, thereby achieving dynamic adjustment of the matching under different transmission powers.

Figure 7:
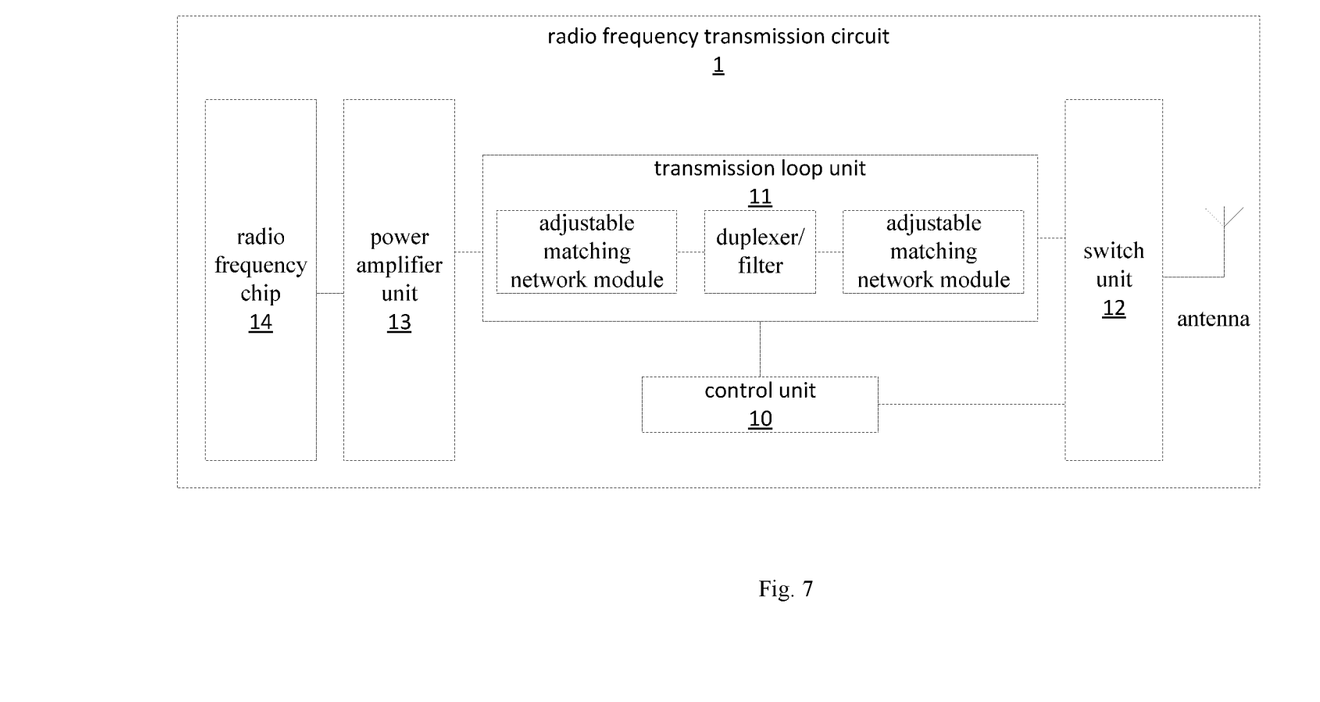
FIG. 7 is a fifth schematic structural diagram of a radio frequency transmission circuit according to an embodiment of the present disclosure.

As a possible implementation, as shown in FIG. 7, illustration is made on the basis that the radio frequency transmission circuit 1 includes one transmission loop unit 11, and the transmission loop unit 11 may include an adjustable matching network module, a duplexer/filter, and another adjustable matching network module, here, the filtering module 111 of the transmission loop unit 11 is specifically the duplexer/filter.

As shown in FIG. 7, the transmission loop unit 11 includes two adjustable matching network modules, an input end of the left adjustable matching network module is connected to an output end of the power amplifier unit 13, and an output end of the left adjustable matching network module is connected to an input end of the duplexer/filter, and an output end of the duplexer/filter is connected to an input end of the right adjustable matching network module.

Figure 9:
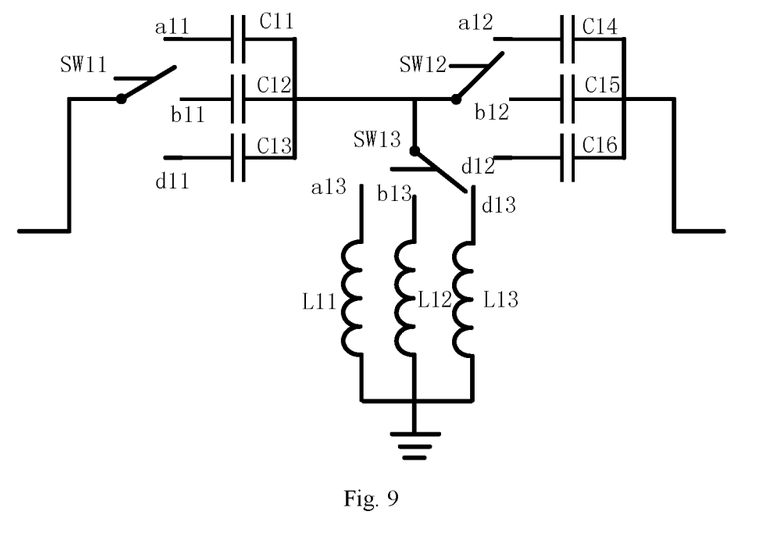
FIG. 9 is a second schematic diagram of a T-type adjustable matching network according to an embodiment of the present disclosure.

In an embodiment, the adjustable matching network module may include adjustable capacitors and adjustable inductors, and may be any one of T-type, double-L type, and Π-type formed by the capacitors and the inductors. For example, such as shown in FIG. 8, it includes a plurality of T-type matching circuits, and one of the loops is selected by switches SW1 and SW2 to operate. As shown in FIG. 9, the network module may include a plurality of matching components.

The two adjustable matching network modules in the transmission loop unit 11 have a same circuit structure, so that the beneficial effects brought by the adjustable matching network module connected to the duplexer/filter output end can be increased, that is, the adjustment becomes more flexible, while adjusting the stray current and power consumption, a antenna and a duplexer/filter can be matched by the matching change of the adjustable matching network module connected to an input end of the duplexer/filter, thus making power output most efficiently.

Each of the two adjustable matching network modules in the radio frequency transmission circuit may include a plurality of matching loops. During the adjustment process, each matching loop represents a transmitting matching loop under different transmission power levels, and in the working process, optimal matching loops of the transmission loop is directly selected by detecting the transmission power of the transmission circuit, thereby achieving a dynamic adjustment of the matching in the case where the different transmission powers are received.

The switch unit 12 is configured to select different operating frequency bands, and the switch unit 12 can also have a function of power detection, and a power monitoring point of the switch unit 12 is connected to a power sampling point of the control unit 10.

The control unit 10 may include a memory chip and a microprocessor. The storage chip is used for storing a matching after an adjustment is finished, and the microprocessor is used to sample the output power and controls switches in the adjustable matching network module.

Exemplarily, a working process of the radio frequency transmission circuit is illustrated by the matching circuit of FIG. 9. In the adjustment process, under a transmission power of 20 dBm, a matching loop 1 of the adjustable matching network is adjusted, and each of contacts for switches SW11, SW12, SW13 to be closed to are selected for the matching loop 1, respectively, such as the switch SW11 is closed to a contact a11, the switch SW12 is closed to a contact a12, and the switch SW13 is closed to a contact a13, thus capacitors C11, C14 and an inductor L11 are adjusted to be optimally matched, and positions of the contacts at this time are recorded, that is, the adjusted matching loop 1 is saved. Under a transmission power of 15 dBm, contacts b11, b12 and b13 for the switches SW11, SW12, SW13 to be closed to are selected for the matching loop 2, that as the switch SW11 is closed to the contact b11, the switch SW12 is closed to the contact b12, and the switch SW13 is closed to the contact b13, thus capacitors C12, C15 and an inductor L12 are adjusted to the be optimally matched, and positions of the contacts at this time are recorded, that is, the adjusted matching loop 2 is saved. In the same way, positions of contacts under the next transmission power are recorded, so that a plurality of different transmission powers and corresponding matching loops can be determined, and correspondence relationships between respective transmission powers and respective matching loops is recorded in a memory of a control unit. Then, during operation of the radio frequency transmission circuit, the control unit selects corresponding contacts according to the received transmission power.

Specifically, the control unit determines, based on the received transmission power and the pre-stored correspondence relationship between the transmission powers and the matching loops, a transmission power having the smallest difference from the received transmission power as a first transmission power, and the first transmission power is greater than the received transmission power, and a matching loop corresponding to the first transmission power is determined as a first matching loop, and the first matching loop is controlled to start to work, thereby achieving dynamic adjustment of the matching under different transmission powers.

It should be noted that the switch unit in the radio frequency transmission circuit according to the embodiment of the present disclosure may have functions of switching and power detection, and may also have only the function of switching, and the function of power detection is implemented as a separate module, i.e., a power detecting unit. Functions of the switch unit may also be realized by a splitter and a power detecting unit.

The radio frequency transmission circuit according to the embodiment of the disclosure uses the adjusted matching loop when receiving a transmission power, so that a fast switching of matching can be achieved, and the radio frequency transmission circuit can be dynamically adjusted according to the change of the transmission power. In a case where the transmission index reaches the standard, the power consumption of the transmission circuit is minimized, thereby reducing the power consumption of the entire radio frequency circuit.

Figure 10:
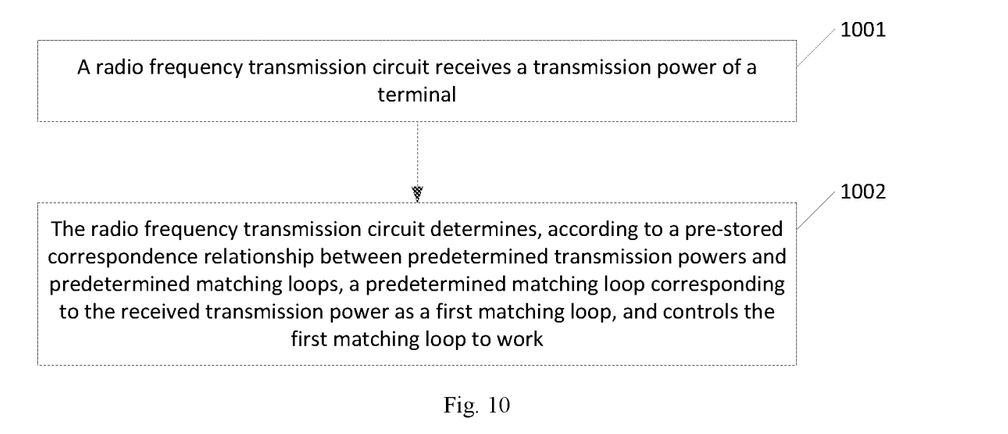
FIG. 10 is a schematic flowchart of a circuit matching method according to an embodiment of the present disclosure.

An embodiment of the present disclosure provides a circuit matching method. As shown in FIG. 10, the method is applied to the foregoing radio frequency transmission circuit, and the method may include steps 1001 and 1002.

At step 1001, a radio frequency transmission circuit receives a transmission power of a terminal.

At step 1002, the radio frequency transmission circuit determines, according to a pre-stored relationship between predetermined transmission powers and predetermined matching loops, a predetermined matching loop corresponding to the received transmission power as a first matching loop, and controls the first matching loop to work.

In an embodiment, during an adjustment stage of the radio frequency transmission circuit, the matching loops corresponding to the predetermined transmission powers are determined according to the predetermined transmission powers, and then the correspondence relationships between respective predetermined transmission powers and respective predetermined matching loops is stored. An optimal matching loop of transmission loop is directly selected by detecting the transmission power of the transmit circuit, thereby achieving dynamic adjustment of the matching under different transmission powers.

In an embodiment, during the adjustment stage of the radio frequency transmission circuit, determining, by the radio frequency transmission circuit, according to the predetermined transmission power, the matching loop corresponding to the predetermined transmission power may include the following steps.

The radio frequency transmission circuit receives a first predetermined transmission power, and adjusts capacitances and/or inductances of a first predetermined matching loop. When current and stray current of the first predetermined matching loop become optimal, a correspondence relationship between the first predetermined transmission power and the first predetermined matching loop is saved.

The radio frequency transmission circuit receives a second predetermined transmission power, and adjusts capacitances and/or inductances of a second predetermined matching loop. When current and stray current of the second predetermined matching loop become optimal, a correspondence relationship between the second predetermined transmission power and the second predetermined matching loop is saved.

The radio frequency transmission circuit receives a third predetermined transmission power, and adjusts capacitances and/or inductances of a third predetermined matching loop. When current and stray current of the third predetermined matching loop become optimal, a correspondence relationship between the third predetermined transmission power and the third predetermined matching loop is saved. And so on, until all correspondence relationships between the predetermined transmission powers and the predetermined matching loop are saved.

Exemplarily, the T-type matching circuit of FIG. 8 illustrates a working process of the radio frequency transmission circuit. In the early stage of adjustment, a transmission power of a terminal is adjusted. For example, when the transmission power of the terminal is adjusted to 20 dBm, a matching loop 1 of an adjustable matching network is adjusted, where the matching loop 1 is a loop formed by a switch SW1 being closed to a contact a1, and a switch SW2 being closed to a contact a2, thus capacitors C1, C2 and an inductor L1 in the matching loop 1 are adjusted to make current and stray current optimal, and matching of the capacitors and the inductor at this time is recorded, that is, the adjusted matching loop 1 is saved; then adjusting the next transmission power, for example, 15 dBm of the transmission power, and a matching loop 2 of the adjustable matching network is adjusted, and the matching loop 2 is a loop formed by the switch SW1 being closed to a contact b1 and the switch SW2 being closed to a contact b2, thus capacitors C3, C4, and an inductor L2 in the matching loop 2 are adjusted to make current and stray current optimal, and matching of the capacitors and the inductor of the matching loop 2 at this time is recorded, that is, the adjusted matching loop 2 is saved; in this way, the next transmission power is adjusted, for example, 10 dBm of the transmission power, and a matching loop 3 of the adjustable matching network is adjusted, and the matching loop 3 is a loop formed by the switch SW1 being closed to a contact d1 and the switch SW2 being closed to a contact d2, thus capacitors C5, C6, and an inductor L3 in the matching loop 3 are adjusted to make current and stray current optimal, and matching of the capacitors and the inductor at this time is recorded, that is, the adjusted matching loop 3 is saved, and correspondence relationships between respective transmission powers and respective matching loops is recorded in a memory of a control unit.

It should be noted that values of the predetermined transmission power in the embodiment of the present disclosure are not limited to the above-mentioned 20 dBm, 15 dBm, and 10, and may be other values, such as 23 dBm, 18 dBm, etc., which are not specifically limited in this embodiment of the present disclosure.

In an embodiment, the radio frequency transmission circuit determines, according to the pre-stored correspondence relationship between the transmission powers and the matching loops, a transmission power having the smallest difference from the received transmission power as a first transmission power, and the first transmission power is greater than the received transmission power, and a matching loop corresponding to the first transmission power is determined as a first matching loop, and the first matching loop is controlled to start to work.

During the operation of the radio frequency transmission circuit, if the radio frequency transmission circuit detects that the currently received transmission power is smaller than 20 dBm and is greater than 15 dBm, the radio frequency transmission circuit queries the pre-stored correspondence relationships between respective transmission powers and respective matching loops to determine a matching loop of the current transmission power to be the matching loop corresponding to the transmission power 20 dBm in the adjustable matching network, such as the matching loop 1 shown in FIG. 8, and then the switch SW1 in the adjustable matching network is controlled to be closed to the contact a1, and the switch SW2 is controlled to be closed to the contact a2, and the matching loop 1 starts to work. When it is detected that the currently received transmission power is less than 15 dBm and greater than 10 dBm, the radio frequency transmission circuit queries the pre-stored correspondence relationships between respective transmission powers and respective matching loop to determine a matching loop of the current transmission power to be the matching loop corresponding to the transmission power 15 dBm in the adjustable matching network, such as the matching loop 2 shown in FIG. 8, and then the switch SW1 in the adjustable matching network is controlled to be closed to the contact b1 and the switch SW2 is controlled to be closed to the contact b2, and the matching loop 2 starts to work. In the same way, when the currently received transmission power is less than 10 dBm and greater than 5 dBm, the matching loop 3 selected by the switches SW1 and SW2 starts to work, that is, the switch SW1 in the adjustable matching network is controlled to be closed to the contact d1, the switch SW2 is controlled to be closed to the contact d2, and so on. Based on the received transmission power, according to the pre-stored correspondence relationship between the transmission powers and the matching loops, dynamic adjustment of the matching under different transmission powers is achieved.

The circuit matching method according to the embodiment of the disclosure, the adjusted matching loop is used when receiving a transmission power, so that a fast switching of matching can be achieved, and the radio frequency transmission circuit can be dynamically adjusted according to the change of the transmission power. In a case where the transmission index reaches the standard, the power consumption of the transmission circuit is minimized, thereby reducing the power consumption of the entire radio frequency circuit.

The embodiment of the present disclosure further provides a computer storage medium in which computer executable instructions are stored, and the computer executable instructions are used for at least one of the foregoing circuit matching methods, for example, used for performing the method as shown in FIG. 10. The computer storage medium may be a storage medium such as a random storage medium RAM, a read-only storage medium ROM or a flash memory (Flash), optionally, a non-transitory storage medium. The executable instructions stored in the computer storage medium according to the embodiment include at least the instructions for the control unit in the foregoing embodiment to perform the corresponding operations.

Those skilled in the art will appreciate that embodiments of the present disclosure can be provided as a method, system, or computer program product. Accordingly, the present disclosure can take the form of a hardware, a software, or a combination of software and hardware. Moreover, the present disclosure can take the form of a computer program product embodied on one or more computer usable storage media (including but not limited to disk storage and optical storage, etc) containing computer usable program code.

The present disclosure has been described with reference to flowchart illustrations and/or block diagrams of methods, apparatus (system), and computer program products according to embodiments of the disclosure. It will be understood that combinations of each flow and/or block of the flowcharts and/or block diagrams, and flows and/or blocks in the flowcharts and/or block diagrams can be implemented by computer program instructions. These computer program instructions can be provided to a processor of a general purpose computer, special purpose computer, embedded processor, or other programmable data processing device to produce a machine that causes the instructions executed by a processor of a computer or other programmable data processing device to produce a device for implementing the functions specified in one or more flows of the flowchart or in a block or blocks of the block diagrams.

The computer program instructions can also be stored in a computer readable memory that can direct a computer or other programmable data processing device to operate in a particular manner, such that the instructions stored in the computer readable memory produce a product including an instruction device. The instruction device implements the functions specified in one or more flows of the flowchart or in a block or blocks of the block diagrams.

These computer program instructions can also be loaded onto a computer or other programmable data processing device such that a series of operational steps are performed on a computer or other programmable device to produce computer-implemented processing, thereby to execute the instructions providing the steps for implementing the functions specified in one or more flows of the flowchart or in a block or blocks of the block diagrams.

The above description is only for the preferred embodiments of the present disclosure, and is not intended to limit the scope of the present disclosure, and modifications made in accordance with the principles of the present disclosure are understood to fall within the scope of the present disclosure.

What is claimed is:

1. A radio frequency transmission circuit comprises a control unit, at least one transmission loop unit, the transmission loop unit comprising at least one predetermined matching loop, and the control unit pre-storing a correspondence relationship between predetermined transmission powers and predetermined matching loops, wherein
    the control unit is configured to determine, according to the pre-stored correspondence relationship between the predetermined transmission powers and the predetermined matching loops, a predetermined matching loop corresponding to the received transmission power as a first matching loop, and control the first matching loop to work,
    wherein the control unit is configured to determine, according to the pre-stored correspondence relationship between the predetermined transmission powers and the predetermined matching loops, a predetermined transmission power having the smallest difference from the received transmission power as a first transmission power, the first transmission power being greater than the received transmission power, determine a predetermined matching loop corresponding to the first transmission power as the first matching loop, and control the first matching loop to work.

2. The radio frequency transmission circuit according to claim 1, wherein the transmission loop unit comprises: a first adjustable matching network module, a filtering module connected to the first adjustable matching network module, and a matching network module connected to the filtering module; and
    the first adjustable matching network module comprises at least one first predetermined matching loop, the at least one first predetermined matching loop comprises a first end and a second end, wherein the first end is connected to the control unit, and the second end is connected to the filtering module.

3. The radio frequency transmission circuit according to claim 1, wherein the transmission loop unit comprises a second adjustable matching network module, a filtering module connected to the second adjustable matching network module, and a third adjustable matching network module connected to the filtering module;
    the second adjustable matching network module comprises at least one second predetermined matching loop, the at least one second predetermined matching loop comprises a third end and a fourth end, wherein the third end is connected to the control unit, and the fourth end is connected to the filtering module; and
    the third adjustable matching network module comprises at least one third predetermined matching loop, the at least one second predetermined matching loop comprises a fifth end and a sixth end, wherein the fifth end is connected to the filtering module, and the sixth end is connected to a switch unit.

4. The radio frequency transmission circuit according to claim 2, wherein
    the first adjustable matching network module is one of double L type, Π type and T type;
    the second adjustable matching network module is one of double L type, Π type and T-type; and
    the third adjustable matching network module is one of double L type, Π type and T type.

5. The radio frequency transmission circuit according to claim 1 wherein the radio frequency transmission circuit comprises a switch unit configured to select different operating frequency bands and detect powers.

6. A circuit matching method comprises:
    determining, according to a pre-stored correspondence relationship between predetermined transmission powers and predetermined matching loops, a predetermined matching loop corresponding to a received transmission power as a first matching loop, and controlling the first matching loop to work,
    wherein the determining, according to the pre-stored correspondence relationship between the predetermined transmission powers and the predetermined matching loops, a predetermined matching loop corresponding to the received transmission power as the first matching loop, and controlling the first matching loop to work comprises:
    determining, according to the pre-stored correspondence relationship between the predetermined transmission powers and the predetermined matching loops, a predetermined transmission power having the smallest difference from the received transmission power as a first transmission power, the first transmission power being greater than the received transmission power, and
    determining a predetermined matching loop corresponding to the first transmission power as the first matching loop, and controlling the first matching loop to work.

7. The circuit matching method according to claim 6, wherein during an adjustment phase of the radio frequency transmission circuit, the method further comprises:
receiving a first predetermined transmission power, and adjusting capacitance and/or inductance of a first predetermined matching loop, and when current and stray current of the first predetermined matching loop become optimal, a correspondence relationship between the first predetermined transmission power and the first predetermined matching loop is saved;
receives a second predetermined transmission power, and adjusts capacitance and/or inductance of a second predetermined matching loop, and when current and stray current of the second predetermined matching loop become optimal, a correspondence relationship between the second predetermined transmission power and the second predetermined matching loop is saved; and
receives a third predetermined transmission power, and adjusts capacitance and/or inductance of a third predetermined matching loop, and when current and stray current of the third predetermined matching loop become optimal, a correspondence relationship between the third predetermined transmission power and the third predetermined matching loop is saved, and so on, until correspondence relationships between all of the predetermined transmission powers and the predetermined matching loops are saved.

8. The circuit matching method according to claim 6, wherein before the determining, according to the pre-stored correspondence relationship between the predetermined transmission powers and the predetermined matching loops, a predetermined matching loop corresponding to the received transmission power as a first matching loop, further comprising:
receiving a transmission power of a terminal.

9. A computer storage medium in which computer executable instructions are stored, wherein the computer executable instructions are used to perform a circuit matching method comprising:
determining, according to a pre-stored correspondence relationship between predetermined transmission powers and predetermined matching loops, a predetermined matching loop corresponding to a received transmission power as a first matching loop, and controlling the first matching loop to work,
wherein the determining, according to the pre-stored correspondence relationship between the predetermined transmission powers and the predetermined matching loops, a predetermined matching loop corresponding to the received transmission power as the first matching loop, and controlling the first matching loop to work comprises:
determining, according to the pre-stored correspondence relationship between the predetermined transmission powers and the predetermined matching loops, a predetermined transmission power having the smallest difference from the received transmission power as a first transmission power, the first transmission power being greater than the received transmission power, and
determining a predetermined matching loop corresponding to the first transmission power as the first matching loop, and controlling the first matching loop to work.

10. The computer storage medium according to claim 9, wherein during an adjustment phase of the radio frequency transmission circuit, the method further comprises:
receiving a first predetermined transmission power, and adjusting capacitance and/or inductance of a first predetermined matching loop, and when current and stray current of the first predetermined matching loop become optimal, a correspondence relationship between the first predetermined transmission power and the first predetermined matching loop is saved;
receives a second predetermined transmission power, and adjusts capacitance and/or inductance of a second predetermined matching loop, and when current and stray current of the second predetermined matching loop become optimal, a correspondence relationship between the second predetermined transmission power and the second predetermined matching loop is saved; and
receives a third predetermined transmission power, and adjusts capacitance and/or inductance of a third predetermined matching loop, and when current and stray current of the third predetermined matching loop become optimal, a correspondence relationship between the third predetermined transmission power and the third predetermined matching loop is saved, and so on, until correspondence relationships between all of the predetermined transmission powers and the predetermined matching loops are saved.

11. The computer storage medium according to claim 9, wherein before the determining, according to the pre-stored correspondence relationship between the predetermined transmission powers and the predetermined matching loops, a predetermined matching loop corresponding to the received transmission power as a first matching loop, further comprising:
receiving a transmission power of a terminal.

12. The radio frequency transmission circuit according to claim 3, wherein
the first adjustable matching network module is one of double L type, Π type and T type;
the second adjustable matching network module is one of double L type, Π type and T-type; and
the third adjustable matching network module is one of double L type, Π type and T type.

* * * * *